(12) United States Patent
Ma

(10) Patent No.: US 7,567,398 B2
(45) Date of Patent: Jul. 28, 2009

(54) DETECTION OF FLY HEIGHT CHANGE IN A DISK DRIVE

(75) Inventor: Yiping Ma, San Diego, CA (US)

(73) Assignee: Iomega Corporation, San Diego, CA (US)

( * ) Notice: Subject to any disclaimer, the term of this patent is extended or adjusted under 35 U.S.C. 154(b) by 0 days.

(21) Appl. No.: 11/863,896

(22) Filed: Sep. 28, 2007

(65) Prior Publication Data

US 2008/0013198 A1      Jan. 17, 2008

Related U.S. Application Data

(63) Continuation-in-part of application No. 10/924,449, filed on Aug. 24, 2004, now abandoned.

(51) Int. Cl.
   *G11B 27/36*     (2006.01)
   *G11B 5/596*     (2006.01)

(52) U.S. Cl. ........................ 360/31; 360/77.07

(58) Field of Classification Search .................. None
See application file for complete search history.

(56) References Cited

U.S. PATENT DOCUMENTS

| | | | |
|---|---|---|---|
| 3,818,502 A | 6/1974 | Chien et al. | |
| 4,384,311 A | 5/1983 | McNeil | |
| 6,097,559 A | 8/2000 | Ottesen et al. | |
| 7,224,548 B1 * | 5/2007 | Emo | 360/78.04 |
| 2001/0040748 A1 | 11/2001 | Nagai et al. | |
| 2003/0193727 A1 | 10/2003 | Fioravanti et al. | |
| 2004/0136105 A1 | 7/2004 | Ma et al. | |
| 2006/0002000 A1 * | 1/2006 | Schultz | 360/75 |

\* cited by examiner

*Primary Examiner*—Joseph H Feild
*Assistant Examiner*—Daniell L Negrón
(74) *Attorney, Agent, or Firm*—Stephen C. Beuerle; Procopio Cory Hargreaves & Savitch LLP

(57) ABSTRACT

A method of detecting a change in fly-height comprising measuring a first baseline position error signal (PES) at a first diameter on a disk, measuring a second baseline PES at a second diameter, measuring a first transient PES at the first diameter subsequently to the first baseline PES, measuring a second transient PES at the second diameter subsequently to the second baseline PES, determining a first change in PES by comparing the first transient PES to the first baseline PES, determining a second change in PES by comparing the second transient PES to the second baseline PES, performing responsive action when one of the first change in PES exceeds a first threshold and the second change in PES exceeds a second threshold, and generating a general error condition when both the first change in PES and the second change in PES exceed respective thresholds.

17 Claims, 3 Drawing Sheets

DETECTION OF FLY HEIGHT CHANGE IN A DISK DRIVE

RELATED APPLICATION

The present application is a continuation-in-part of co-pending U.S. patent application Ser. No. 10/924,449, entitled DETECTION OF FLY HEIGHT CHANGE IN A DISK DRIVE, of concurrent ownership, filed on Aug. 24, 2004, the disclosure of which is hereby incorporated by reference.

TECHNICAL FIELD

This invention relates to computer storage products, and more particularly to detecting changes in fly height for disk drives.

BACKGROUND

A disk drive is a data storage device that stores data in concentric tracks on a disk. Data is written to or read from the disk by spinning the disk about a central axis while positioning a transducer near a target track of the disk. During a read operation, data is transferred from the target track to an attached host through the transducer. During a write operation, data is transferred in the opposite direction.

During typical disk drive operation, the transducer does not contact the surface of the disk. Instead, the transducer rides along a cushion of air generated by the motion of the disk. The transducer is normally mounted within a slider structure that provides the necessary lift in response to the air currents generated by the disk. The distance between the transducer/slider and the disk surface during disk drive operation is known as the "fly height" of the transducer.

The fly height is controlled by the suspension attached to the slider and the airbearing of the slider. For magnetic purposes, the fly height is measured as a distance between the read/write elements and the magnetic surface. There are several conditions that create disturbances between the airbearing and the disk surface that can change the fly height. These conditions include altitude, temperature, and contamination. An extreme in any of these conditions will degrade the error rate performance of the drive. These conditions are taken into account during the development of the airbearing designs.

Because the transducer is held aloft during disk drive operation, friction and wear problems associated with contact between the transducer and the disk surface are usually avoided. However, due to the extremely close spacing of the heads and disk surface, any contamination of the read-write heads or disk platters can lead to a head crash—a failure of the disk in which the head scrapes across the platter surface, often grinding away the thin magnetic film. For giant magnetoresistive head technologies (GMR heads) in particular, a minor head contact due to contamination (that does not remove the magnetic surface of the disk) could still result in the head temporarily overheating, due to friction with the disk surface, and renders the disk unreadable until the head temperature stabilizes.

Therefore, what is needed is a disk drive that can monitor the fly-height and take corrective action upon the first indication of a change in the fly-height. Preferably, the monitoring would be accomplished without adding components that increase the cost of the drive.

SUMMARY

Embodiments of the present invention as presented herein provide at least for a method of detecting a change in fly-height comprising measuring a first baseline position error signal (PES) representing an initial PES at a first diameter on a disk, measuring a second baseline PES representing an initial PES at a second diameter on the disk, measuring a first transient PES at the first diameter subsequently to the first baseline PES, measuring a second transient PES at the second diameter subsequently to the second baseline PES, determining a first change in PES by comparing the first transient PES to the first baseline PES, determining a second change in PES by comparing the second transient PES to the second baseline PES, performing at least one responsive action when one of the first change in PES exceeds a first threshold and the second change in PES exceeds a second threshold, and generating a general error condition when both the first change in PES exceeds the first threshold and the second change in PES exceeds the second threshold.

BRIEF DESCRIPTION OF THE DRAWINGS

These and other features and advantages of the invention will become more apparent upon reading the following detailed description and upon reference to the accompanying drawings.

DETAILED DESCRIPTION

In a disk drive, a position error signal (PES) is indicative of the position of the head with respect to the center of a particular track. Particularly, during track following, a servo system generates the PES from the received servo information and then uses the PES to generate a correction signal which is provided to a power amplifier to control the amount of current through the actuator coil, in order to adjust the position of the head accordingly. Typically, the PES is presented as a position dependent signal having a magnitude indicative of the relative distance between the head and the center of a track and a polarity indicative of the direction of the head with respect to the track center.

A position error signal is determined by comparing the amplitude of the signals read from neighboring bursts. The PES is proportional to the difference between the signal amplitudes of the neighboring bursts, divided by the sum of their signal amplitudes. Thus, the PES represents the offset distance between the head and track centerline as defined by the servo information embedded in the disk. The PES is then used as part of a closed loop servo system to correct the position of the head with respect to the track.

Figure 1:
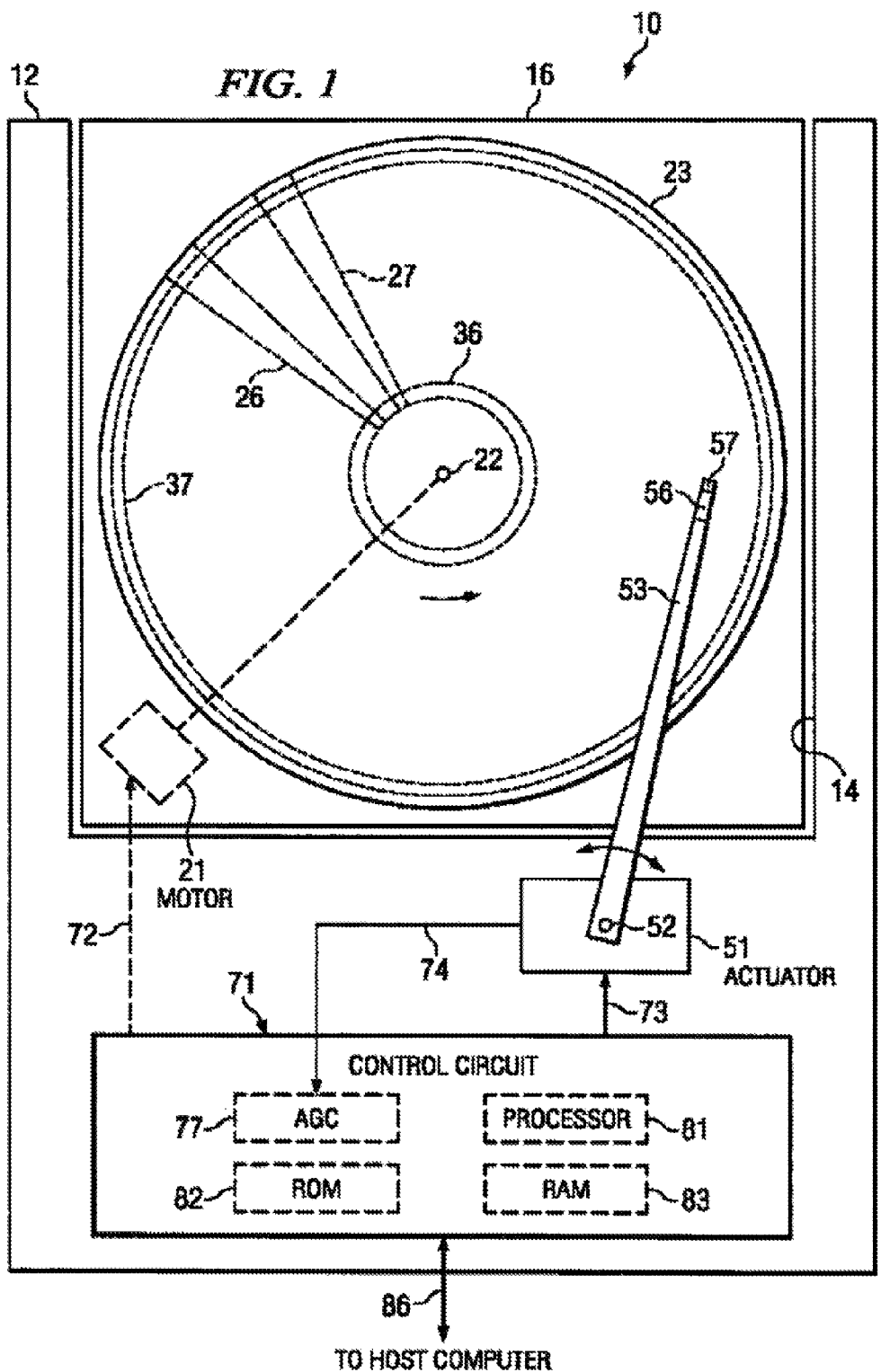
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Data tracks are arranged in a concentric manner ranging from the radially innermost tracks 36 to the radially outermost tracks 37. User data is stored in the many data tracks that are disposed from the innermost tracks 36 to the outermost tracks 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a giant magneto-resistive (GMR) head. However, it could alternatively be some other type of head, such as a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the innermost tracks 36 and the outermost tracks 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. As stated above, the distance the head floats above the disk is known as the "fly-height."

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

As the heads 57 get dirty, the fly height decreases. The decrease in the fly height increases the friction between the heads 57 and the disk 23, which causes the slider to get off-track, thus increasing the PES. Therefore, monitoring the PES can be used to indicate a change in the fly height.

Figure 2:
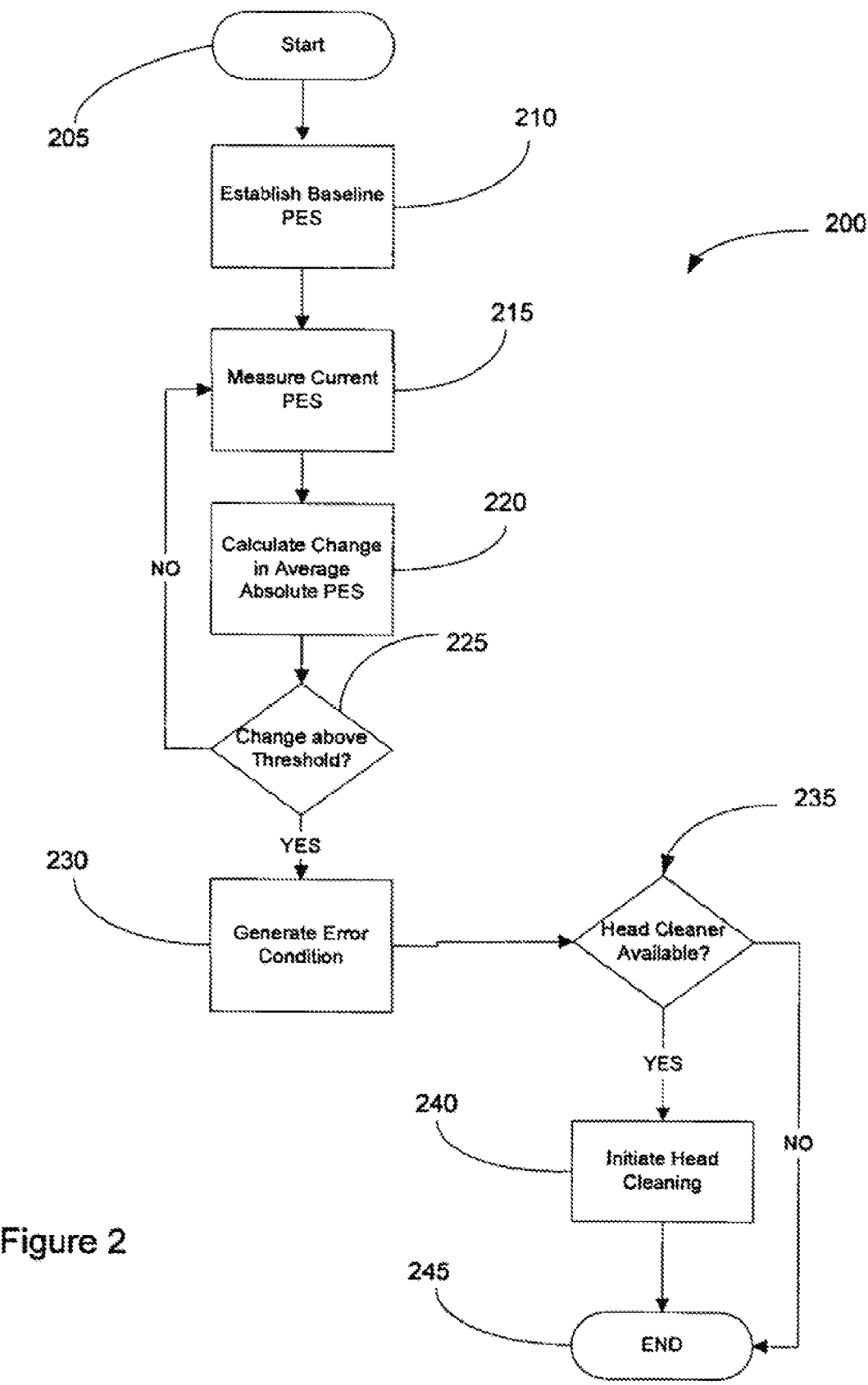
FIG. 2 is a flowchart illustrating a process for determining fly height decrease in a disk drive by monitoring the PES.

FIG. 2 is a flowchart showing the process 200 for detecting the fly height change in the present invention. The process 200 begins at a START block 205. Proceeding to block 210, the process 200 establishes a baseline PES for the drive 12. The baseline PES represents the PES at the initial life of the disk and may be stored in memory for comparison purposes.

Proceeding to block 215, the process 200 measures the current PES of the drive 12. As stated above, over time the heads 57 of the drive 12 may get dirty and thereby affect the value of the PES. The PES at block 215 may be measured at a regular interval. Also, the PES may be measured on one or more heads 57 of the drive. After the current PES is measured, the process 200 proceeds to block 220. In block 220, the change in the average absolute PES is calculated by comparing the current measured PES (or an average of a predetermined number of measured PESs) to the baseline PES.

Proceeding to block 225, the change in the absolute PES is compared to a threshold value. The threshold value may be selected in a variety of manners, including being predetermined, measured, or calculated. If the change in the absolute PES is below the threshold value, the process 200 proceeds along the NO branch back to block 215 to measure the next current PES at an appropriate interval. If the change in the absolute PES is above the threshold value, the process 200 proceeds along the YES branch to block 230 where an error condition is generated by the drive 12.

Proceeding to block 235, the process 200 determines whether the drive 12 has a head cleaner. If the drive 12 has a head cleaner, the process 200 proceeds along the YES branch to block 240 where a head cleaning procedure is initiated. As stated above, if the heads 57 of the drive 12 get dirty, then the PES may be changed. By cleaning the heads 57, the fly height should return to normal and the PES should therefore return to a value close to the baseline PES. After the head cleaning is initiated, or if the drive 12 is determined not to be a removable hard drive in block 235, the process terminates in END block 245.

Figure 3:
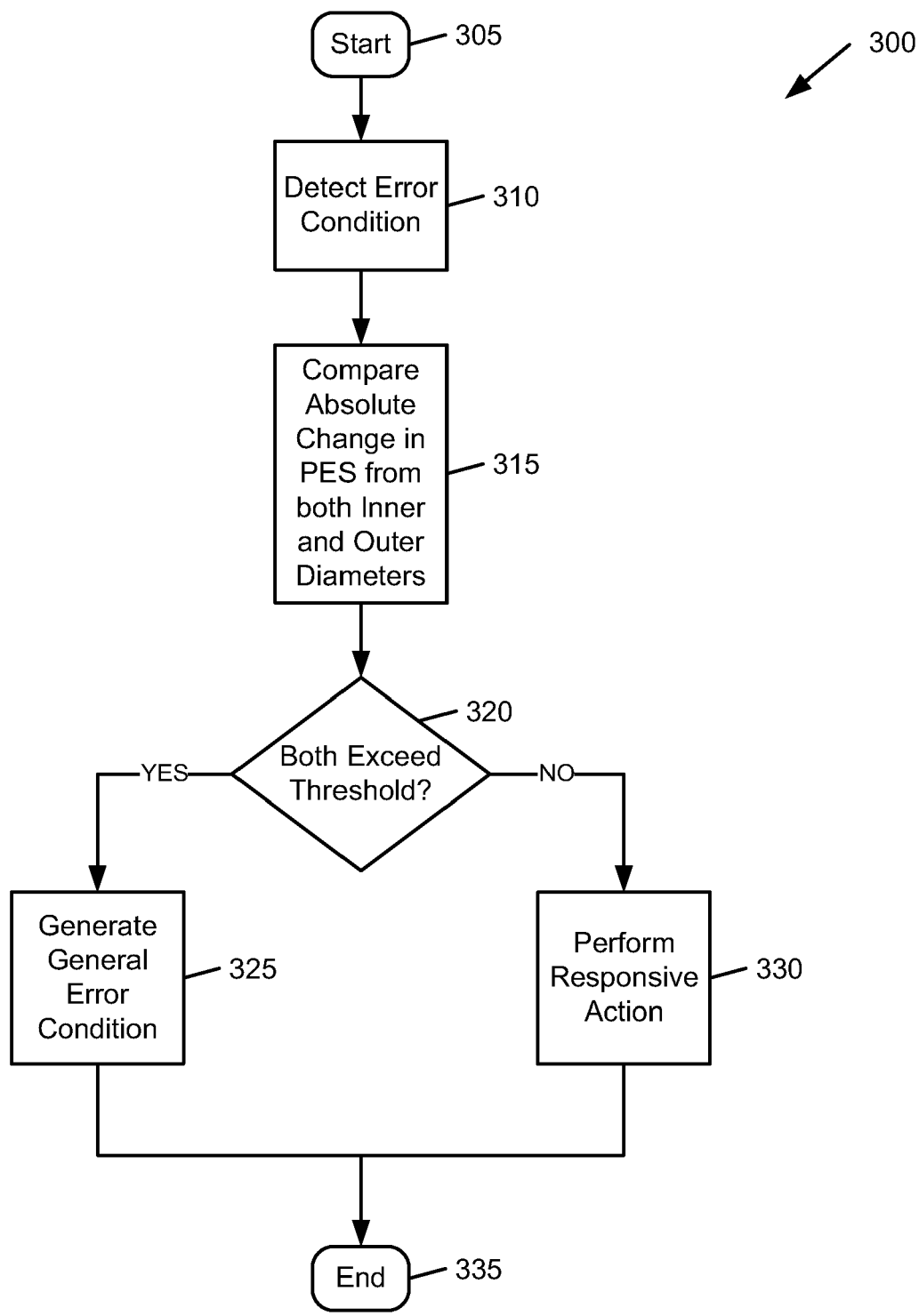
FIG. 3 is a flowchart illustrating a process for determining fly height decrease in a disk drive by monitoring multiple PESs.

FIG. 3 discloses a process 300 according to an alternative embodiment of the present invention. The process 300 begins at a START block 305. Proceeding to block 310, the process 300 detects the error condition generated in block 230 and then proceeds to block 315 where the absolute changes in the PES are compared at both the inner diameter 36 and the outer diameter 37 of the disk 23. This is accomplished by having a first baseline PES measured at the inner diameter 36 and a second baseline PES measured at the outer diameter 37. These first and second baseline PESs are then compared to corresponding first and second transient PESs.

Proceeding to block 320, the changes in both PES at both the inner diameter 36 and the outer diameter 37 are compared against corresponding thresholds. If the changes in the PES at both the inner diameter 36 and the outer diameter 37 exceed the threshold, the process 300 proceeds along the YES branch to block 325. In block 325, a general error condition is generated indicating a possible future failure of the drive. If the PES is changing due to contamination issues, the PES will often be affected at certain diameter first depending on the slider design. Thus, if the change in both the first and second PESs exceed the threshold, it is likely the result of another factor, such as a vibration.

Returning to block 320, if the change in one of the inner diameter 36 PES and the outer diameter 37 PES exceeds the threshold, but the change in the other does not exceed the threshold, the process proceeds along the NO branch to block 330. At block 330, one, or more, of a plurality of possible responsive actions is performed. In one embodiment, a head cleaning procedure is initiated, at block 330. For example, a change in the inner diameter PES and not the outer diameter PES may be indicative of dirty heads 57. By cleaning the heads 57, the fly height should return to normal and the PES should therefore return to a value close to the baseline PES. In another embodiment, a decreasing fly height condition is generated, at block 330.

In another embodiment, where a performance of a responsive action at block 330 is already in progress, and the absolute changes in an inner diameter PES and an outer diameter PES both exceed the threshold the process proceeds along the YES branch to block 325. A general error condition is generated, at block 325, and the performance underway of the responsive action is canceled.

After the one, or more, responsive action is performed, or after the general error condition is generated at block 325, the process terminates at END block 335. It will be appreciated that other types of responsive actions are possible, alternatively, or in addition to the responsive actions articulated in the foregoing.

Numerous variations and modifications of the invention will become readily apparent to those skilled in the art. Accordingly, the invention may be embodied in other specific forms without departing from its spirit or essential characteristics.

What is claimed is:

1. A method of initiating head cleaning in a disk drive comprising:
    establishing a baseline position error signal (PES);
    measuring the transient PES at a plurality of different radii of the disk drive, wherein at least one of the plurality of different radii includes an outer diameter of the disk drive;
    calculating a change in average absolute PES; and
    performing a responsive action including generating an error condition when the change in average absolute PES exceeds a threshold at two or more of the plurality of different radii.

2. The method of claim 1, further comprising canceling the performance of a responsive action.

3. A method of detecting a change in fly-height comprising:
    measuring a first baseline position error signal (PES) representing an initial PES at a first diameter on a disk;
    measuring a second baseline PES representing an initial PES at a second diameter on the disk;
    measuring a first transient PES at the first diameter subsequently to the first baseline PES;
    measuring a second transient PES at the second diameter subsequently to the second baseline PES;
    determining a first change in PES by comparing the first transient PES to the first baseline PES;
    determining a second change in PES by comparing the second transient PES to the second baseline PES;
    performing at least one responsive action when one of the first change in PES exceeds a first threshold and the second change in PES exceeds a second threshold; and
    generating a general error condition when both the first change in PES exceeds the first threshold and the second change in PES exceeds the second threshold.

4. The method of claim 3, wherein the first diameter includes an inner-diameter of the disk.

5. The method of claim 3, wherein the second predetermined diameter includes an outer-diameter of the disk.

6. The method of claim 3, wherein the at least one responsive action includes generating a decreasing fly height condition.

7. The method of claim 3, wherein the at least one responsive action includes initiating a head cleaning procedure.

8. The method of claim 3, further comprising determining a corresponding first change in PES and a corresponding second change in PES for each head of the disk.

9. The method of claim 8, further comprising:
    performing the at least one responsive action when one of the first corresponding change in PES exceeds the first threshold and the second corresponding change in PES exceeds the second threshold; and
    generating a general error condition when both the first corresponding change in PES exceeds the first threshold and the second corresponding change in PES exceeds the second threshold.

10. An apparatus for detecting a change in fly-height comprising:
    means for measuring a first baseline position error signal (PES) representing an initial PES at a first diameter on a disk;
    means for measuring a second baseline PES representing an initial PES at a second diameter on the disk;
    means for measuring a first transient PES at the first diameter subsequently to the first baseline PES;
    means for measuring a second transient PES at the second diameter subsequently to the second baseline PES;
    means for determining a first change in PES by comparing the first transient PES to the first baseline PES;
    means for determining a second change in PES by comparing the second transient PES to the second baseline PES;
    means for performing at least one responsive action when one of the first change in PES exceeds a first threshold and the second change in PES exceeds a second threshold; and means for generating a general error condition when both the first change in PES exceeds the first threshold and the second change in PES exceeds the second threshold.

11. The apparatus of claim 10, wherein the first diameter where a measurement is made by the means for measuring a first transient PES and the means for measuring a first baseline position error signal (PES) includes an inner-diameter of the disk.

12. The apparatus of claim 10, wherein the second predetermined diameter where a measurement is made by the means for measuring a second transient PES and the means for measuring a second baseline position error signal (PES) includes an outer-diameter of the disk.

13. The apparatus of claim 10, wherein the at least one responsive action of the means for performing at least one responsive action includes generating a decreasing fly height condition.

14. The apparatus of claim 10, wherein the at least one responsive action of the means for performing at least one responsive action includes initiating a head cleaning procedure.

15. The apparatus of claim 10, further comprising means for determining a corresponding first change in PES and a corresponding second change in PES for each head of the disk.

16. The apparatus of claim 15, further comprising:

means for performing the responsive action when one of the first corresponding change in PES exceeds the first threshold and the second corresponding change in PES exceeds the second threshold; and means for generating a general error condition when both the first corresponding change in PES exceeds the first threshold and the second corresponding change in PES exceeds the second threshold.

17. The apparatus of claim 10, further comprising means for canceling a performance of the at least one responsive action when a general error condition is generated.

* * * * *